United States Patent
Pytel et al.

(10) Patent No.: US 12,229,976 B2
(45) Date of Patent: *Feb. 18, 2025

(54) METHOD OF CHARACTERIZING A SURFACE TEXTURE AND TEXTURE CHARACTERIZATION TOOL

(71) Applicant: CertainTeed Gypsum, Inc., Malvern, PA (US)

(72) Inventors: Rachel Z. Pytel, Newton, MA (US); Sidath S. Wijesooriya, Wayland, MA (US); Simon Mazoyer, Paris (FR); Brice Dubost, Newton, MA (US)

(73) Assignee: CertainTeed Gypsum, Inc., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,344

(22) Filed: Jun. 26, 2023

(65) Prior Publication Data

US 2024/0087148 A1 Mar. 14, 2024

Related U.S. Application Data

(63) Continuation of application No. 16/817,962, filed on Mar. 13, 2020, now Pat. No. 11,688,085.

(60) Provisional application No. 62/819,319, filed on Mar. 15, 2019.

(51) Int. Cl.
| | |
|---|---|
| *G06T 7/41* | (2017.01) |
| *G06T 7/40* | (2017.01) |
| *G06V 10/141* | (2022.01) |
| *G06V 10/20* | (2022.01) |
| *G06V 10/56* | (2022.01) |

(52) U.S. Cl.
CPC ............... *G06T 7/41* (2017.01); *G06T 7/40* (2013.01); *G06V 10/141* (2022.01); *G06V 10/20* (2022.01); *G06V 10/56* (2022.01); *G06T 2207/30184* (2013.01)

(58) Field of Classification Search
CPC ............ G06T 7/40; G06T 2207/30184; G06T 2207/30132; G06T 2207/30161; G06T 2207/30108; G06V 10/141
See application file for complete search history.

(56) References Cited

U.S. PATENT DOCUMENTS 11,688,085 B2 * 6/2023 Pytel .................. G06V 10/56
382/108

FOREIGN PATENT DOCUMENTS

JP 2005251035 A * 9/2005 ............ G06T 15/00

* cited by examiner

*Primary Examiner* — Manav Seth
(74) *Attorney, Agent, or Firm* — McDonnell Boehnen Hulbert & Berghoff LLP

(57) ABSTRACT

The present disclosure relates generally to evaluating the surfaces of a building. The present disclosure relates more particularly to a method of characterizing a surface texture of a building surface. The method includes illuminating a first area of the building surface from a single direction and capturing an image of the first area using a camera while the first area is illuminated. The first image includes a first group of digital pixel values. The method further includes calculating a first set of values that characterize a first surface texture of the first area based on a first group of digital pixel values of the image, and comparing the first set of values to a second set of values that characterize a second surface texture, so as to produce a comparator value.

20 Claims, 9 Drawing Sheets

METHOD OF CHARACTERIZING A SURFACE TEXTURE AND TEXTURE CHARACTERIZATION TOOL

CROSS-REFERENCE TO RELATED APPLICATIONS

This application is a continuation of Ser. No. 16/817,962, filed Mar. 13, 2020, which claims the benefit of priority of U.S. Provisional Patent Application No. 62/819,319, filed Mar. 15, 2019, each of which is hereby incorporated herein by reference in its entirety.

BACKGROUND OF THE DISCLOSURE

1. Field of the Disclosure

The present disclosure relates generally to evaluating the surfaces of the walls of a building, for example, to identify differences in surface texture along a wall formed of gypsum wallboard that includes joints between the individual boards. The present disclosure relates more particularly to a method of characterizing a surface texture of a building surface, a tool for characterizing a surface texture, and a method of using such a tool.

2. Technical Background

Many building surfaces, such as walls, ceilings, and floors, are designed to have a uniform appearance across their visible surface. Accordingly, any specific areas of the building surface that have a noticeably different appearance from the rest of the surface is considered undesirable. Achieving uniformity across an entire building surface can be challenging, particularly because many building surfaces are constructed using construction panels. At the edges of these panels there is inherently a change in the structure of the building surface where the two edges meet. In order to maintain a uniform appearance across the surface, the joint where the edges of the panels meet is obscured.

For example, walls are often constructed using panels of gypsum board. At the joint where two panels meet, joint compound is used to cover the edges of the gypsum boards and provide a smooth transition from one board to the next. Finishing a wall so that the joints are entirely undetectable requires great skill and effort. However, in most instances complete concealment of the joint is not necessary. In some cases, the joint will be in a location where the lighting conditions will help hide any variances in the wall surface. Further, in some instances, the building surface will be in a location where perfect uniformity is unexpected. However, determining the level of uniformity that is appropriate poses its own challenges. Often, the builders who are finishing the building surface do not have the expertise to determine if the surface is appropriately uniform. Moreover, some customers may be more discerning than the average person and demand greater uniformity across the building surfaces than is appropriate for a particular circumstance.

The present inventors have recognized that an objective method of measuring the surface texture of a wall of a building would be advantageous to builders and customers.

SUMMARY OF THE DISCLOSURE

In one aspect, the present disclosure provides a method of characterizing a surface texture of a building surface, the method comprising:

activating, by a computing device, a light source of a texture characterization tool while the texture characterization tool is disposed over a first area of a surface of the wall so as to illuminate the first area from a single direction;

receiving, via the computing device, a first image of the first area captured by a camera of the texture characterization tool while the first area is illuminated by the light source, the first image including a first group of digital pixel values;

calculating, using the computing device, a first set of values that characterize a first surface texture of the first area based on the first group of digital pixel values;

comparing, using the computing device, the first set of values to a second set of values that characterize a second surface texture, so as to produce a comparator value.

In another aspect, the disclosure provides non-transitory computer-readable medium having stored thereon program instructions that upon execution by a processor, cause performance of a set of operations to perform the method of characterizing a surface texture according to the disclosure.

In another aspect, the disclosure provides a computing device comprising:
 a processor; and
 a non-transitory computer-readable medium having stored thereon program instructions that upon execution by the processor, cause performance of a set of operations to perform the method of characterizing a surface texture according to the disclosure.

In another aspect, the disclosure provides a texture characterization tool comprising:
 a housing including a cavity and an opening on one side of the housing providing access to the cavity;
 a computing device including a processor and a non-transitory computer-readable medium having stored thereon program instructions that upon execution by the processor, cause performance of a set of operations to perform the method of characterizing a surface texture according to the disclosure;
 a camera in communication with the cavity and disposed opposite the opening, the camera having an optical axis that passes through the opening of the cavity; and
 a light source in communication with the cavity and configured to project light toward the optical axis from a single direction.

In another aspect, the disclosure provides a method of preparing a building surface using a texture characterization tool according to the disclosure, the method comprising:
 positioning an edge of the opening of the cavity of the housing of the texture characterization tool around a first area of the building surface;
 activating the texture characterization tool to illuminate the first area of the wall from a single direction using a light source in the cavity and to capture an image of the first area of the wall using a camera of the texture characterization tool while the first area is illuminated by the light source; and
 receiving a comparator value or an assessment indicator that is based on the comparator value from a computing device of the texture characterization tool.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

As described above, the present inventors have noted that the conventional subjective method of evaluating the surface texture of walls, and comparing the surface textures of sections of walls requires expertise, and can lead to inconsistencies and shifting expectations. The inventors have determined that an objective method of measuring the surface texture of a wall of a building would be advantageous to builders and customers.

Accordingly, one aspect of the disclosure is a method of characterizing a surface texture of a building surface. The method using a computing device to activate a light source of a texture characterization tool while the texture characterization tool is disposed over a first area of a building surface so as to illuminate the first area from a single direction. While the first area is illuminated by the light source, a first image is captured by a camera of the texture characterization tool, where the first image includes a first group of digital pixel values. The first image is received by the computing device, which calculates a first set of values that characterize a first surface texture of the first area based on the first group of digital pixel values. The computing device compares the first set of values to a second set of values that characterize a second surface texture, so as to produce a comparator value.

The term "pixel", as used herein, refers to a subsection of an image received by the camera, where the image is formed by an array of pixels. The digital representation of the image is formed by an array of values, each of which is a representation that may reflect light intensity and, in some embodiments, color and corresponds to a pixel of the image. The term "digital pixel value," as used herein, refers to a value associated with a subsection of the image and is based on the values of the pixels of the image. For example, in some embodiments, the digital pixel values directly correspond to the values of each pixel in the image. In other embodiments, the digital pixel values correspond to a group of pixels at the subsection of the image. For example, in some embodiments the digital pixel value corresponds to an average value of a group of pixels. In other embodiments, the digital pixel values correspond to values generated by a filtering operation of several pixels at the image subsection. For example, the digital pixel values may correspond to a weighted average of the value of pixels at the image subsection.

In certain embodiments as otherwise described herein, the building surface is the surface of an internal wall of the building. For example, in some embodiments, the building surface is the surface of one or more wallboard panels. In other embodiments, the building surface is the exposed surface of a ceiling. Still, in other embodiments, the building surface is a floor surface.

Figure 1:
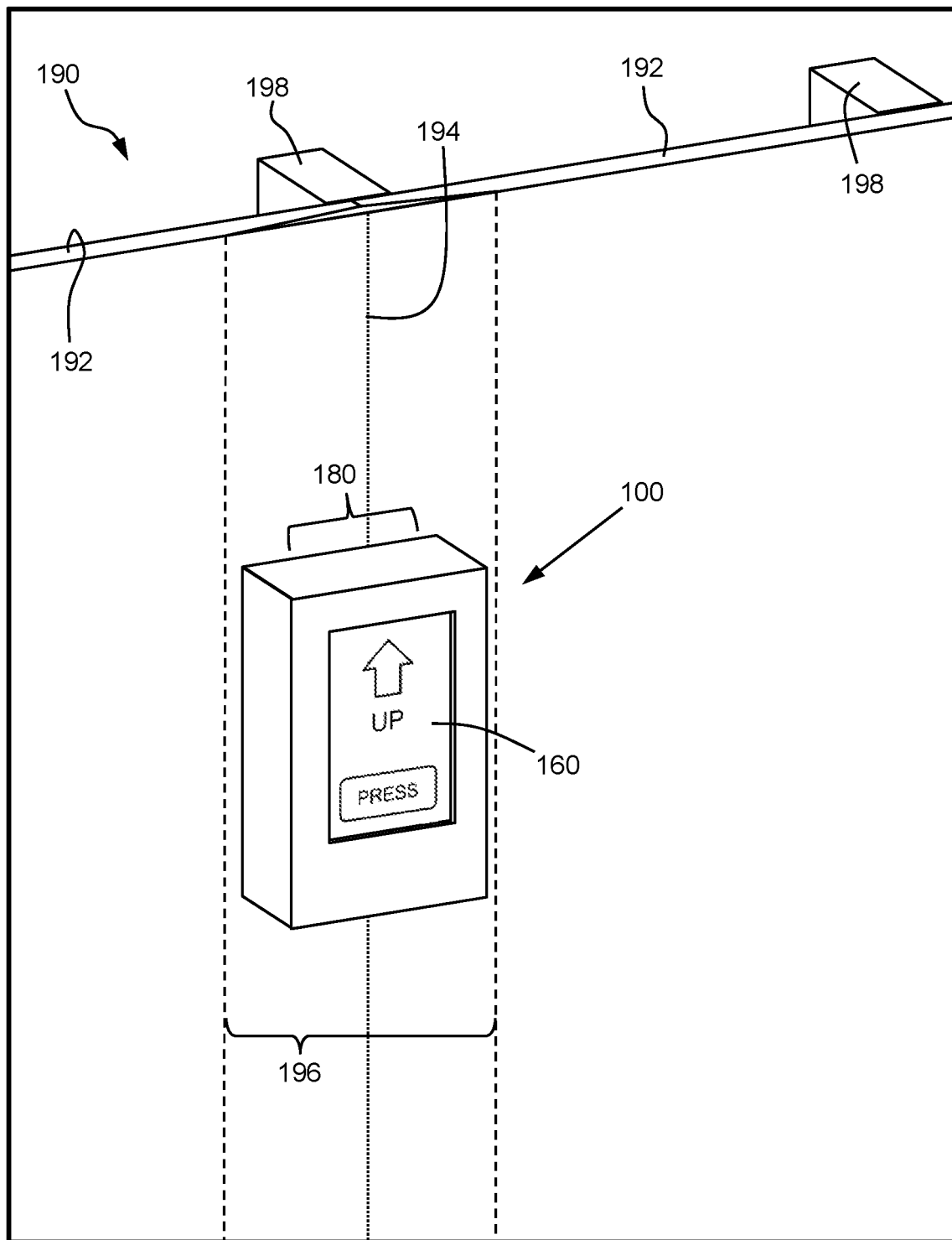
FIG. 1 is a schematic perspective view of a texture characterization tool according to an embodiment of the disclosure disposed over a first area of a wall.
Figure 2:
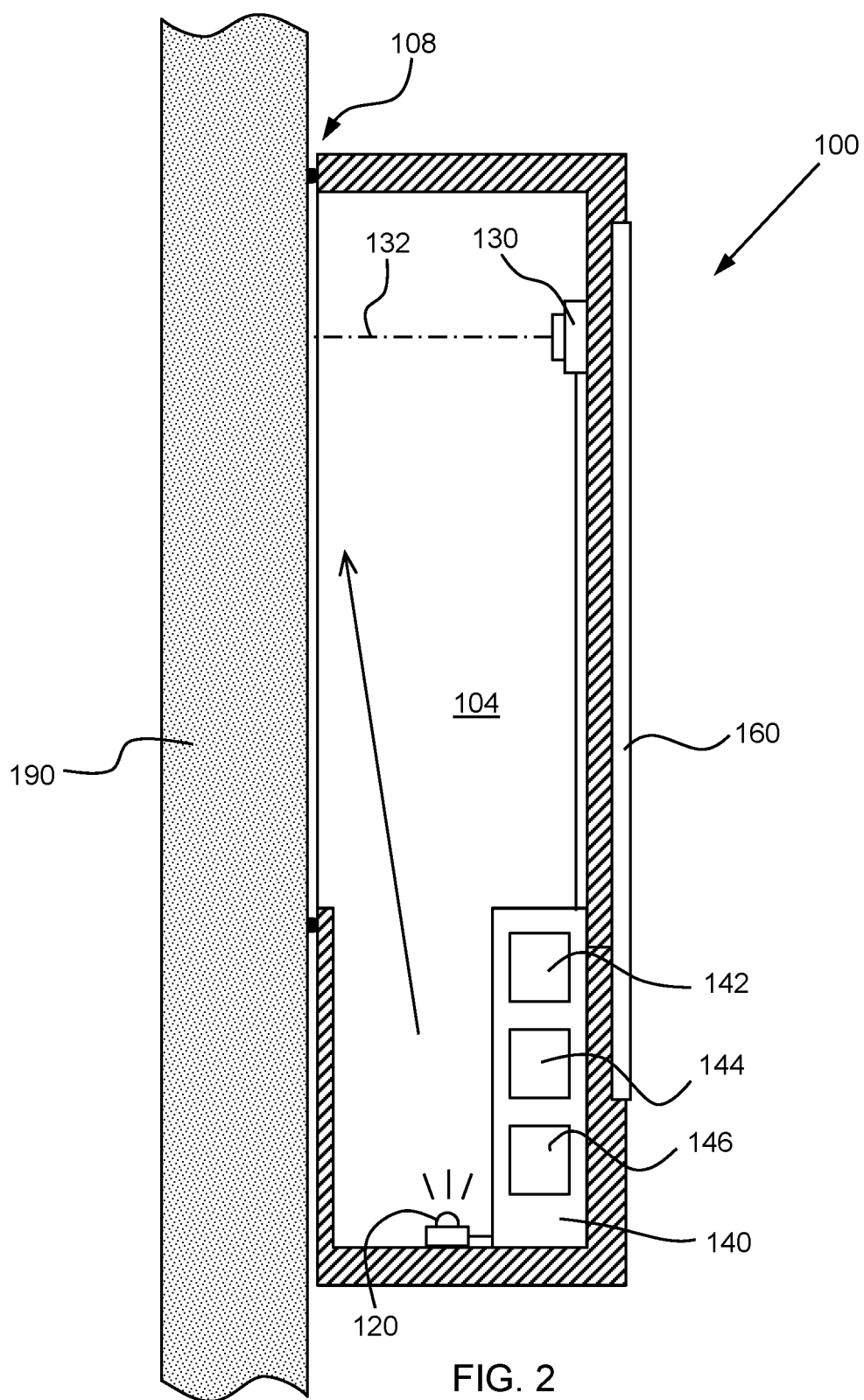
FIG. 2 is a schematic cross-sectional side view of the texture characterization tool of FIG. 1.

FIGS. 1 and 2 schematically illustrate the use of a texture characterization tool in such a method. FIG. 1 shows texture characterization tool 100 disposed over a first area of a building surface in the form of a wall 190 formed of gypsum wallboards 192 attached to framing elements 198 in the form of wood studs. The first area of wall 190 that is being evaluated by texture characterization tool 100 is at the joint 194 between two gypsum wallboards 192. Joint 194 is covered with joint compound 196, which extends laterally by several inches on either side of joint 194. Further, joint compound 196 and wallboards 192 are coated with a layer of paint.

FIG. 2 shows a cross section of texture characterization tool 100 while capturing an image of the first area of wall 190. During operation, light source 120, described in more detail below, is activated by computing device 140 to illuminate the first area of the surface from a single direction. Illumination from a "single direction," as used herein, refers to illumination such that the angle of incidence of any light directed from the light source to the first area of the surface falls on one side of a plane passing through the surface normal. For example, the light from light source 120 in FIG. 2 that illuminates the first area of wall 190 is projected onto the surface from a direction that is below a plane extending through the surface normal. In some embodiments, the light source illuminates the first area of the wall from a focused direction, where the term focused direction refers to a scenario where every trajectory extending between any part of the light source and any portion of the first area of the wall is within 90 degrees of any other trajectory extending from the light source to any portion of the first area of the wall.

While the first area of the surface of wall 190 is illuminated by light source 120, a camera 130 captures an image of the first area of the surface of wall 190. In some embodiments, the first area of the surface is defined as the portion of the surface that is within the field of view of the camera and surrounds the optical axis 132 of camera 130. In other embodiments, the first area corresponds to a portion of the field of view of the camera. Still in other embodiments, the first area extends beyond the field of view of the camera.

The image captured by the camera 130 is received by computing device 140, which analyzes the image to calculate a first set of values that characterize a first surface texture of the first area based on a first group of digital pixel values from the first image. In some embodiments, the first group of digital pixel values corresponds to all of the pixels from the image. In other embodiments, the first group of digital pixel values corresponds to only a portion of the pixels of the image. For example, in some embodiments, the first group of digital pixel values corresponds to a selection of pixels at the center of the image.

The computing device 140 then compares the first set of values to a second set of values to produce a comparator value. For example, the comparator value is a number or a set of numbers that characterize differences between the first set of values and the second set of values.

In certain embodiments, the second set of values is a standard set of values stored in a memory of the computing device. For example, in some embodiments, the second set of values is selected from a group of stored sets of values based on certain characteristics, such as a desired surface texture or surface finish requirement, such as a glossy finish or a certain gypsum board finish level (e.g., level 4 or level 5).

In other embodiments, the second set of values is based on another image captured by the texture characterization tool. For example, in certain embodiments of the method of characterizing a surface texture as otherwise described herein, the method further includes activating the light source of the texture characterization tool using the computing device while the texture characterization tool is disposed over a second area of the building surface so as to illuminate the second area from a single direction. The method further includes receiving, via the computing device, a second image of the second area captured by the camera of the texture characterization tool while the second area is illuminated by the light source, where the second image includes a second group of digital pixel values. The computing device then calculates the second set of values based on the second group of digital pixel values.

Figure 3:
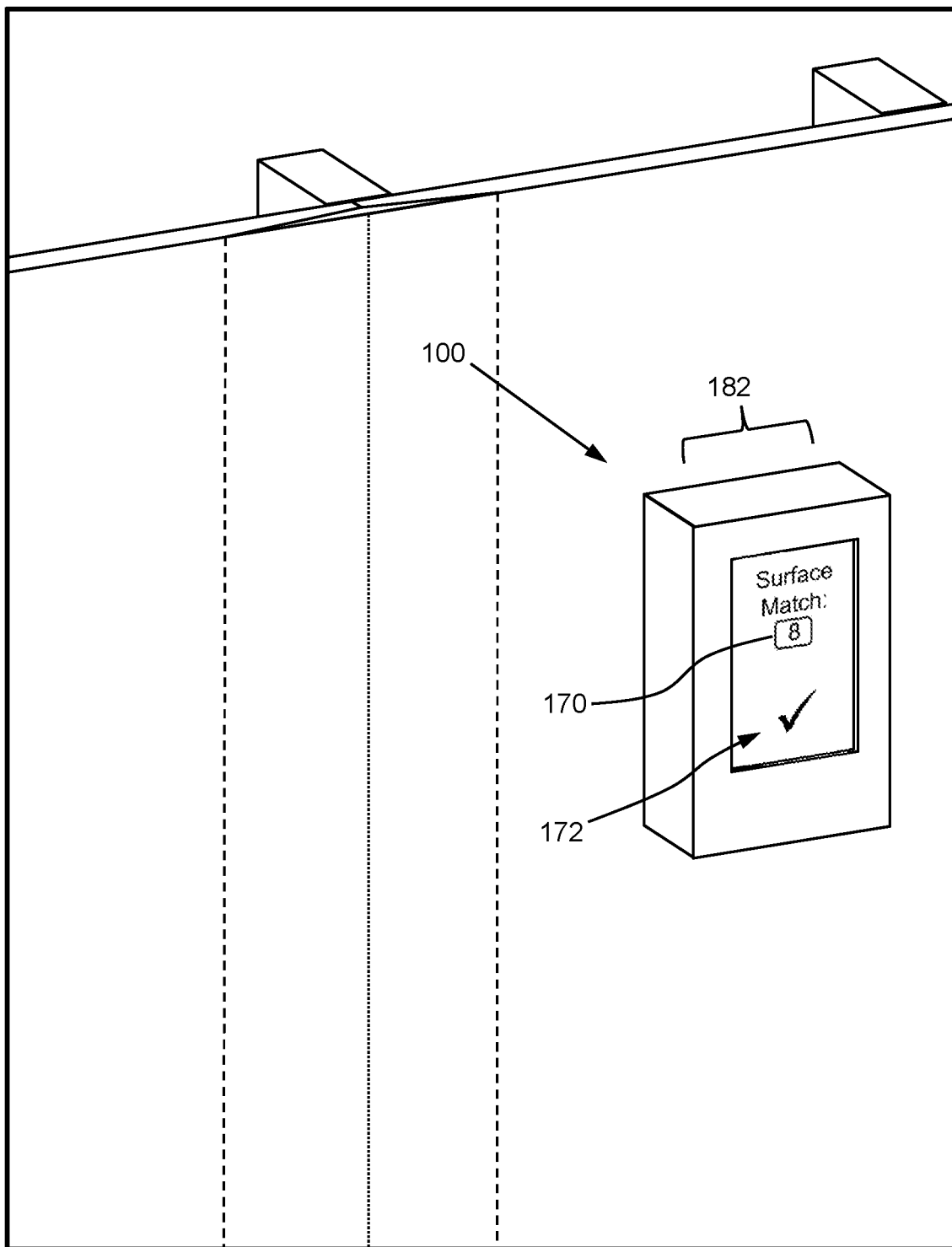
FIG. 3 is a schematic perspective view of the texture characterization tool of FIG. 1 disposed over a second area of the wall.
Figure 4:
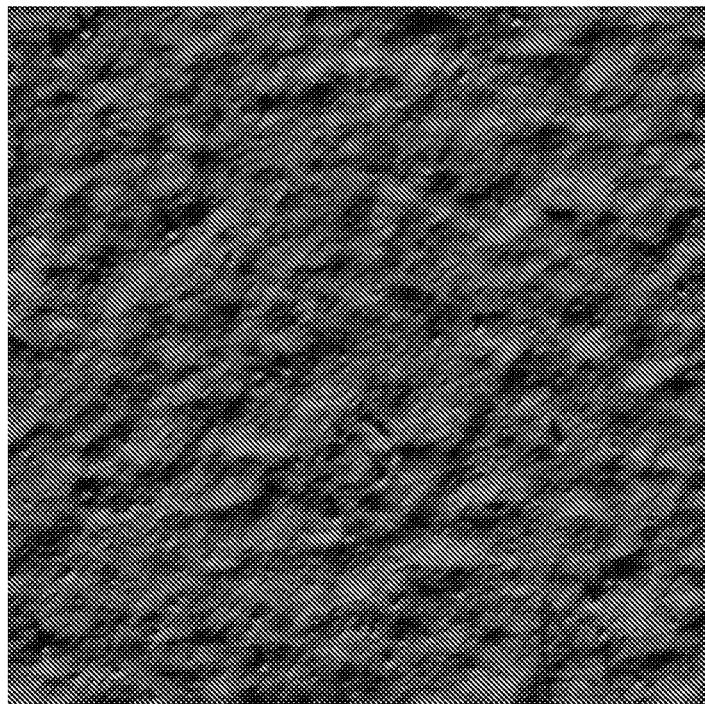
FIG. 4 is a comparison of images of different areas of a building surface captured using a texture characterization tool according to an embodiment of the disclosure.
Figure 4:
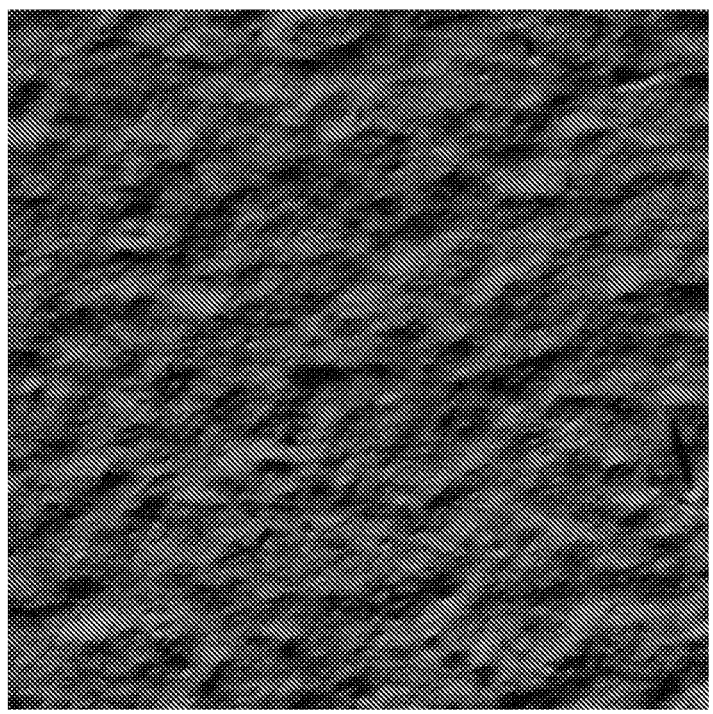

FIG. 3 schematically illustrates the use of texture characterization tool 100 in such a method. In FIG. 3, texture characterization tool 100 has been moved to a second area of wall 190 and a second image has been captured using camera 130 while light source 120 is illuminated. FIG. 4 illustrates examples of images captured by the texture characterization tool. For example, the upper image is captured in the first area of wall 190 where the joint compound 196 is present, as depicted in FIG. 1, and the lower image is captured in the second area of wall 190, as depicted in FIG. 3. Computing device 140 analyzes the second image to calculate a second set of values from a second group of digital pixel values corresponding to the second image. As described above, the computing device 140 then compares the second set of values to the first set of values to produce the comparator value.

In certain embodiments of the method of characterizing a surface texture as otherwise described herein, the method includes transmitting, from the computing device, the comparator value to a display. For example, texture characterization tool 100 includes a display 160 in data communication with computing device 140. Computing device 140 is operable to transmit certain information to display 160 for outputting the information to a user. FIG. 3 illustrates display 160 presenting a comparator value 170, labelled as a "surface match," to the user.

In certain embodiments of the method of characterizing a surface texture as otherwise described herein, the display is part of the texture characterization tool. For example, in texture characterization tool 100, display 160 is disposed on the outside of the housing of texture characterization tool 100. In other embodiments, the display physically separated from the housing of the texture characterization tool. For example, in some embodiments, the display is part of a notebook computer, a smartphone, or a tablet.

In certain embodiments of the method of characterizing a surface texture as otherwise described herein, the comparator value is a numerical value. For example, in some embodiments, the comparator value is directly calculated by a mathematical computation comparing the first set of values to the second set of values. For example, the comparator value may be a summation of the difference between each value of the first set and a corresponding value of the second set.

In certain embodiments of the method of characterizing a surface texture as otherwise described herein, the method includes generating, using the computing device, an assessment indicator based on the comparator value. In some embodiments, the assessment indicator is a Boolean value. For example, the computing device may generate a pass or a fail indicator based on the comparator value. In other embodiments the assessment indicator is a numerical value. For example, the computing device may use the comparator value to generate an assessment indicator on a scale of 0 to 5. Such a scale could coincide with a gypsum board finish level, for example. Still, in other embodiments, the assessment indicator includes a qualitative value. For example, the computing device may use the comparator value to generate a verbal assessment indicator, such as "excellent," "good," "fair," or "poor." This assessment indicator may reference a comparison between two surfaces, or a comparison between a single surface and a benchmark, as explained above.

In certain embodiments of the method of characterizing a surface texture as otherwise described herein, the method includes outputting, from the computing device, the assessment indicator to an end user. For example, in some embodiments, the assessment indicator is transmitted, by the computing device, to a display. FIG. 3 illustrates an assessment indicator 172 presented on display 160 in the form of a Boolean value, shown as a checkmark. Such an assessment indicator may identify an acceptable match between the surface texture of the first area with the surface texture of the second area. In other embodiments the assessment indicator may be output to the user by other methods. In some embodiments, the assessment indicator is presented as a color, for example, the assessment indicator is presented by one or more lights that use the colors green, yellow and red to present the assessment of the surface texture. In other embodiments, the assessment indicator is presented as a sound, for example, a chime for a positive assessment and a buzz for a negative assessment. Other methods of presenting the assessment indicator to the end user are also possible.

While the embodiment depicted in FIGS. 1-3 indicate that the first image is captured from an area of the wall 190 covered by the joint compound 196 and the second image is captured from an area of the wall 190 where the surface is formed by a wallboard 192, in other embodiments, the order of the captured images is reversed.

In certain embodiments of the method of characterizing a surface texture as otherwise described herein, the method further includes receiving, from an end user, a target quality of the surface texture, and generating the assessment indicator based on the target quality received from the user. For example, in some embodiments, the texture characterization tool requests information from an end user that relates to the desired texture of the surface being assessed. In some embodiments, the requested information is related to a type of surface finish for the surface, such as glossy. In other embodiments, the requested information is related to a desired quality level, such as a gypsum board finish level. The computing device then uses the information from the user to determine criteria, for example a value or range of values, for the comparator value to meet an acceptable quality level based on the user entered information.

In some embodiments, the user information is entered using an input, such as a keyboard, button, joystick, touchscreen, or other input as would be appreciated by those of ordinary skill in the art. In certain embodiments, the input is disposed on the housing of the texture characterization tool. In other embodiments, the input may be remote from the housing. For example, the input may be part of a wireless controller, a notebook computer, a smartphone or a tablet computer.

In certain embodiments of the method of characterizing a surface texture as otherwise described herein, the method includes generating, using the computing device, an instruction message based on the comparator value, the instruction message including instructions for further finishing of a first section of the building surface that includes the first area. For example, in some embodiments, based on the comparator value, the computing device determines that an additional layer of primer, or an additional layer of paint, would reduce a discrepancy between two sections of a wall. In response, the computing device creates an instruction message to add the layer of primer or paint to the wall and outputs the instruction message to the end user. Likewise, in some embodiments, the computing device determines that sanding the area of a wall that includes the first section will improve the surface texture of the wall. For example, in some embodiments, the first area of the wall corresponds to an area covered with a joint compound and the instruction message suggests sanding the area of joint compound to modify the surface texture.

In certain embodiments of the method of characterizing a surface texture as otherwise described herein, calculating the first set of values includes using an autocorrelation function, where each of the first set of values corresponds to an offset distance between the image and an offset copy of the image used in autocorrelation function. For example, in some embodiments, the first value in the first set of values is the average of each digital pixel value multiplied by itself, the second value in the set is the average of each digital pixel value multiplied by an adjacent digital pixel value, the third value in the set is the average of each digital pixel value multiplied by the digital pixel value that is offset by two, and so on.

In some embodiments, the autocorrelation function is one dimensional. For example, in some embodiments, the autocorrelation function calculates the first set of values based on offsets in a single direction. In some embodiments, the direction of the offset used in the autocorrelation function coincides with the direction of light that is used to illuminate the first area. In other embodiments, the autocorrelation function is two dimensional. Further, in some embodiments the direction of offset is independent of the lighting direction of the first image. Examples of images that are analyzed using an autocorrelation function are described in more detail below.

In certain embodiments of the method of characterizing a surface texture as otherwise described herein, the comparator value is a difference between an extremum value of the first set of values and an extremum value of the second set of values. For example, in some embodiments, the comparator value may be the difference between the highest value in the first set of values and the highest value in the second set of values. Likewise, in some embodiments the comparator value is the difference between the lowest value in the first set of values and the lowest value in the second set of values. As an example, for a first set of values having a minimum of −200 at 600 μm and a second set of values having a minimum of −220 at 550 μm, the comparator value may be based on the difference between the minimums of −220 and −200.

In certain embodiments of the method of characterizing a surface texture as otherwise described herein, the comparator value is a difference between the offset corresponding to an extremum value of the first set of values and the offset corresponding to an extremum value of the second set of values. For example, the comparator value may be the difference between the offset in the first set of values that corresponds to the minimum value in the first set and the offset in the second set of values that corresponds to the minimum value in the second set. For example, considering the first and second sets of values presented in the preceding paragraph with a minimum of −200 at 600 μm in the first set of values and a minimum of −220 at 550 μm in the second set of values, the comparator value may be based on the difference of the offsets corresponding to each respective minimum of 600 μm and 550 μm.

In certain embodiments of the method of characterizing a surface texture as otherwise described herein, the comparator value is a cumulative difference between the first set of values and the second set of values. For example, in some embodiments, the comparator value may be based on the sum of the difference at each offset of the value from the first set of values and the respective value from the second set of values. Other analytical methods to compare the first and second set of values are also possible.

In certain embodiments of the method of characterizing a surface texture as otherwise described herein, calculating the first set of values includes determining a percentage of the digital pixel values of the first image that have a brightness within a first brightness range. For example, using a grayscale representation of the image, with values ranging from 0 to 255, the first set of values may include the percentage of digital pixel values of the first image that are between 200 and 255. Further, the first set of values may also include the percentage of digital pixel values of the first image that are in other ranges. The particular ranges used may be the same, or may differ across the brightness spectrum.

Figure 5:
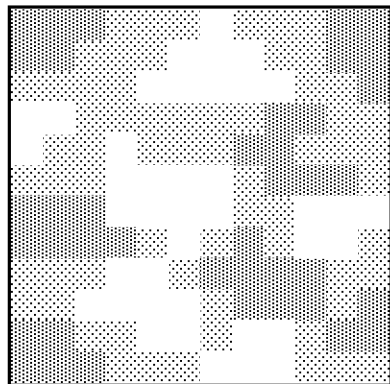
FIG. 5 is a schematic representation of an analysis of an image captured using a texture characterization tool according to an embodiment of the disclosure.
Figure 5:
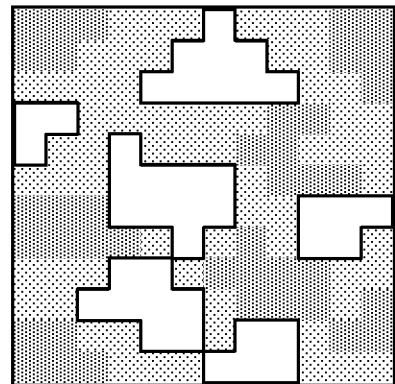

FIG. 5 schematically depicts such a method. The image on the left in FIG. 5 is a simple schematic depiction of an image of 12×12 pixels of a surface texture, where the pixels have varying brightness. The image on the right in FIG. 5 illustrates a simple image analysis performed by the computing device that identifies the brightest pixels in the image so as to calculate the percentage of the image that is bright. In this case, 28% of the image falls within the range of bright pixels. While the images in FIGS. 5-9 are simple schematic depictions with only a few different shades, and the "bright" pixels identified in FIG. 5 are all a single shade of white, in more complex embodiments the "bright" pixels may include a range of different brightness values.

In certain embodiments of the method of characterizing a surface texture as otherwise described herein, calculating the first set of values includes identifying shapes within the first group of pixels defined by a brightness range. For example, in FIG. 5, the image on the right identifies a plurality of shapes defined by bright pixels. Likewise, additional shapes may be identified comprising dark pixels. In some embodiments, the shapes may be defined by absolute ranges for bright pixels, dark pixels, or ranges therebetween. In other embodiments, the shapes may be identified using image processing algorithms that use a brightness tolerance to identify the shapes. For example, in some embodiments the shapes are defined by groups of pixels surrounding a target pixel that are no more than a certain percentage difference from the brightness of the target pixel. The target pixels may be selected using a variety of different methods. For example, the target pixels may have localized maximum or minimum brightness values.

Figure 6:
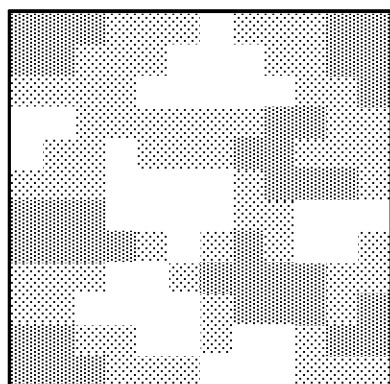
FIG. 6 is a schematic representation of a comparison of two images captured using a texture characterization tool according to an embodiment of the disclosure.
Figure 6:
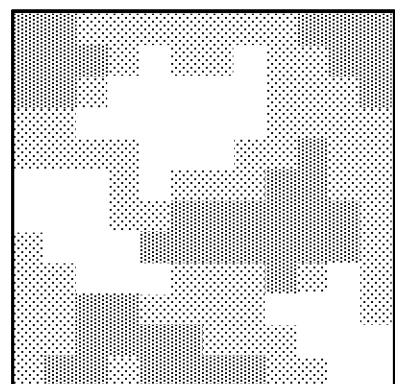

In certain embodiments of the method of characterizing a surface texture as otherwise described herein, the first set of values includes a value quantifying the identified shapes from the first group of pixels, for example based on size, compactness or orientation. For example, FIG. 6 schematically depicts two simple images with shapes that differ in size. In particular, the identifiable shapes in the image on the left are smaller than the identifiable shapes in the image on the right. In some embodiments, the first set of values may include a value that quantifies the average size of identifiable shapes in the image. Further, in some embodiments, the comparator value may compare the value of the average size of identifiable shapes from the first set of values with a value of the average size of identifiable shapes from a second set of values based on a second image, such as the image on the right.

Figure 7:
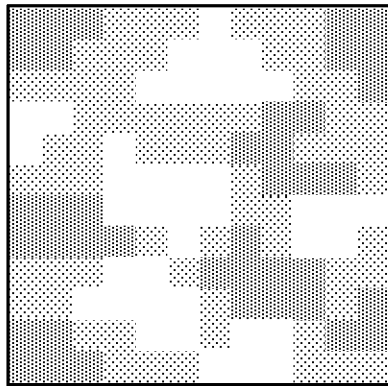
FIG. 7 is a schematic representation of a comparison of two images captured using a texture characterization tool according to another embodiment of the disclosure.
Figure 7:
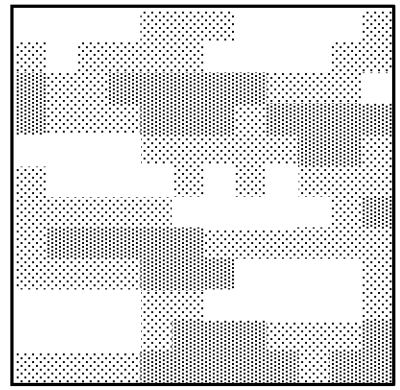

In another example, FIG. 7 schematically depicts two simple images with shapes that have a different aspect ratio. In particular, the identifiable shapes in the image on the left have a smaller aspect ratio than the identifiable shapes in the image on the right, which are long and thin. In some embodiments, the first set of values may include a value that quantifies the aspect ratio of identifiable shapes in the image. Further, in some embodiments, the comparator value may compare the value of the average aspect ratio of identifiable shapes from the first set of values with a value of the average aspect ratio of identifiable shapes from a second set of values based on a second image, such as the image on the right.

Figure 8:
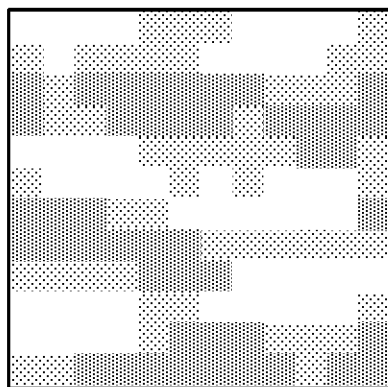
FIG. 8 is a schematic representation of a comparison of two images captured using a texture characterization tool according to another embodiment of the disclosure.
Figure 8:
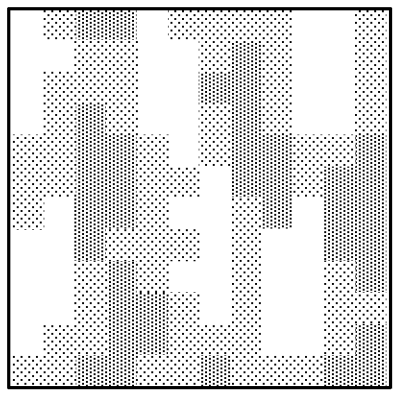

In yet another example, FIG. 8 schematically depicts two simple images with shapes that have a different orientation. In particular, the identifiable shapes in the image on the left extend left to right, while the identifiable shapes in the image on the right extend up and down. In some embodiments, the first set of values may include a value that quantifies the orientation of identifiable shapes in the image. Further, in some embodiments, the comparator value may compare the value quantifying the orientation of identifiable shapes from the first set of values with a value quantifying the orientation of identifiable shapes from a second set of values based on a second image, such as the image on the right.

Further, in some embodiments, the first set of values may include more than one value that quantifies characteristics of the shapes within the image. For example, the first set of values may include values for each of size, aspect ratio, and orientation of bright areas as well as values for size, aspect ratio and orientation of dark areas. Other shape characteristics and combinations of shape characteristics are also possible.

In certain embodiments of the method of characterizing a surface texture as otherwise described herein, the method further includes receiving, via the first computing device, an initial image of the first area. The computing device then measures a brightness of the initial image and, in response to the brightness of the initial image, sets a light intensity value for the light source that is used during the capturing of the first image. Accordingly, the initial image can be used to calibrate the intensity of the light source when capturing the image that is used to evaluate the surface texture. Such a calibration image may increase the likelihood of having a broad range of brightness values in the first image when evaluating the surface texture. For example, if the building surface is a glossy white color, the majority of the initial image may be very bright, prompting the computing device to reduce the intensity value of the light source, such that subsequent images used in evaluating the surface texture of the building surface have a broad mix of brightness values. Further, in some embodiments, the computing device uses image processing to filter the brightness range across the image.

In certain embodiments, the computing device prompts an end user to input an intensity value for the light source. For example, in some embodiments, the computing device prompts the user to input a light intensity value for use during the surface characterization method that is based on the lighting conditions at the first area of the building surface. For example, the user may input a very strong light intensity value for the light source when evaluating a surface area that is adjacent to an east-facing window with direct sunlight. In contrast, if the first area is in a region with low lighting, the user may enter a low intensity value for the light source, so as to more accurately analyze the surface texture under the expected lighting conditions.

In certain embodiments of the method of characterizing a surface texture as otherwise described herein, the computing device includes a non-transitory computer-readable medium storing a three-dimensional rendering of an architectural space including the building surface, and the method further includes determining, by the computing device, a target location of the first area based on lighting parameters of the three-dimensional rendering of the architectural space as well as outputting, via the computing device, a positioning instruction to an end user based on the target location. For example, in some embodiments, the three-dimensional rendering of the architectural space includes the walls of a room, the windows and the electrical lighting conditions. Based on these lighting conditions and a database of lighting parameters, the computing device calculates areas of the building surface where the characteristics of the surface texture are most important or noticeable, and the computing device outputs a positioning instruction for the texture characterization tool based on that calculation. In some embodiments, the three-dimensional rendering also includes the construction characteristics of the building surface, such as wallboard joint location, and the computing device also considers this information when calculating the positioning instruction.

In some embodiments, the positioning instruction is output to a builder, for example as a text-based instruction on a display of the texture characterization tool. The builder reads the instruction and measures the surface texture characteristics using the texture characterization tool at the identified location. In other embodiments, the positioning instruction is output to a robot as a navigational instruction. The robot then operates, based on instructions stored in a memory, to move to the identified location and measure the surface characteristics of the first area using the texture characterization tool.

In certain embodiments of the method of characterizing a surface texture as otherwise described herein, the positioning instruction includes a target height of the texture characterization tool for capturing the first image. As an example, the texture characterization tool may provide an instruction to analyze the surface characteristics at the joint on the west wall at a height of four feet, with this instruction being based on important lighting characteristics of the building surface at that location and based on common viewing angles by occupants of the room.

In other embodiments, the positioning instruction includes a target orientation of the characterization tool for capturing the first image. For example, in some embodiments, the texture characterization tool outputs a positioning instruction based on observable lighting conditions. For example, the positioning instruction may indicate that the texture characterization tool should be turned to be aligned with a light source. For example, a display of the tool may display an arrow and suggest that the arrow point toward the strongest light source. In another example, where the texture characterization tool is informed of the lighting conditions on the building surface, the positioning instruction may simply state that the tool should be rotated so that a particular direction is "up." Such an example is shown in FIG. 1.

In certain embodiments of the method of characterizing a surface texture as otherwise described herein, the positioning instruction includes an image of a 3D rendering of an architectural space that includes the building surface and shows a target location of the texture characterization tool for capturing the first image. For example, in some embodiments, the texture characterization tool displays the 3D rendering of the surrounding room on a display and illustrates a precise location within the 3D rendering where the texture characterization tool should be used to analyze the surface texture of the building surface.

In another aspect, the disclosure provides a non-transitory computer-readable medium having stored thereon program instructions that upon execution by a processor, cause performance of a set of operations to perform the method of characterizing a surface texture of the disclosure. In another aspect, the disclosure provides a computing device including a process and a non-transitory computer-readable medium having stored thereon program instructions that upon execution by a processor, cause performance of a set of operations to perform the method of characterizing a surface texture of the disclosure.

FIG. 2 includes a schematic representation of a computing device 140 included in the texture characterization tool 100 that includes a non-transitory computer-readable medium with program instructions stored thereon for performing the method of the disclosure. Computing device 140 includes a processor 142, a memory 144, and a network interface 146.

While computing device 140 of texture characterization tool 100 is disposed within the texture characterization tool housing, in other embodiments, the computing device is separate from the housing. For example, in some embodiments, the computing device is part of a smartphone, tablet or notebook computer. Further, while computing device 140 is a client device, i.e., a device actively operated by the user, in other embodiments, the computing device is a server device, e.g., a device that provides computational services to a client device. Moreover, other types of computational platforms are also possible in embodiments of the disclosure.

Processor 142 of computing device 140 includes a computer processing elements, e.g., a central processing unit (CPU), an integrated circuit that performs processor operations, a digital signal processor (DSP), or a network processor. In some embodiments, the processor includes register memory that temporarily stores instructions being executed and corresponding data, as well as cache memory that temporarily stores performed instructions. Memory 144 is a computer-usable memory, e.g., random access memory (RAM), read-only memory (ROM), or non-volatile memory such as flash memory, solid state drives, or hard-disk drives. In certain embodiments, memory 144 stores program instructions that are executable by processor 142 for carrying out the methods and operations of the disclosure. Network interface 146 provides digital communication between computing device 140 and other computing systems or devices. In some embodiments, the network interface operates via a physical wired connection, such as an ethernet connection. In other embodiments, the network interface communicates via a wireless connection, e.g., IEEE 802.11 (Wifi) or BLUETOOTH. Other communication conventions are also possible.

In another aspect, the disclosure provides a texture characterization tool that includes a housing having a cavity and an opening on one side of the housing providing access to the cavity. The texture characterization tool also includes a computing device including a process and a non-transitory computer-readable medium having stored thereon program instructions that upon execution by a processor, cause performance of a set of operations to perform the method of characterizing a surface texture according to any of the embodiments described above. The texture characterization tool also includes a camera disposed opposite the opening that has an optical axis passing through the opening of the cavity. Further, the texture characterization tool also includes a light source that is configured to provide light inside the cavity and project the light toward the optical axis of the camera from a single direction.

Figure 9:
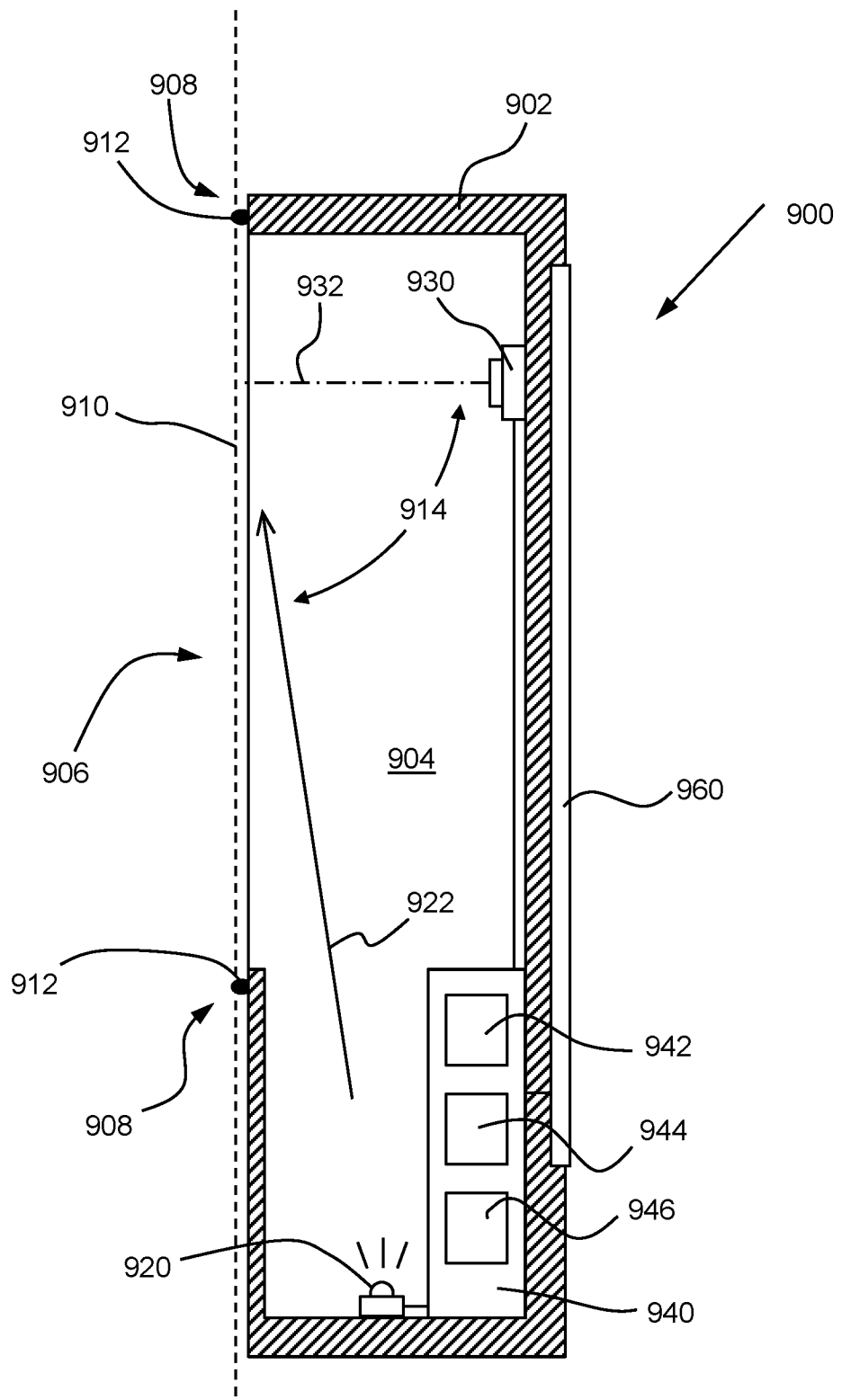
FIG. 9 is a schematic cross-sectional side view of a texture characterization tool according to another embodiment of the disclosure.

Such a texture characterization tool is schematically depicted in FIG. 9. Texture characterization tool 900 includes a housing 902 that forms a cavity 904 therein. The cavity 904 is partially surrounded within housing 902 but is accessible via an opening 906 on one side of housing 902. Computing device 940, which includes processor 942, memory 944 and network interface 946 is included inside housing 902 at one end of the texture characterization tool 900. In other embodiments, computing device 940 is not positioned within the cavity of the housing. In some embodiments the computing device is disposed elsewhere within the housing of the texture characterization tool. Further, in some embodiments the computing device is disposed remotely from the housing and the housing includes a wired or wireless communication interface for receiving instructions from the computing device and sending data to the computing device.

Texture characterization tool 900 also includes a camera 930 that is disposed opposite opening 906 of housing 902 and has an optical axis 932 that passes through opening 906. The optical axis 932 of camera 930 is defined by the direction of the image collected by camera 930, and is not dependent upon any particular lenses or specific optical structures. In texture characterization tool 900, camera 930 is disposed within cavity 904. In other embodiments, the camera is disposed outside of the cavity of the housing but has visual access into the cavity and through the opening, for example via an aperture on the edge of the cavity.

Texture characterization tool 900 further includes a light source 920 that provides light inside cavity 904 and projects the light toward optical axis 932 from a single direction, as explained above with regard to light source 120 of texture characterization tool 100.

In certain embodiments of the texture characterization tool as otherwise described herein, an edge of the opening of the cavity defines a flat plane. In certain embodiments, the flat plane defined by the edge of the opening is substantially perpendicular to the optical axis of the camera. For example, the edge 908 of opening 906 defines a flat plane 910 so that edge 908 can closely engage with a flat wall around the outside of opening 906. Further, optical axis 932 of camera 930 is arranged so as to be substantially perpendicular to the flat plane 910 defined by edge 908. Accordingly, optical axis 932 is substantially normal to any surface that is engaged by texture characterization tool 900 in order to capture an image of the surface. This alignment of optical axis 932 helps to reduce distortion of the images captured by camera 930. For example, in some embodiments the optical axis of the camera is within 10 degrees of perpendicular to the plane defined by the edge of the cavity opening, e.g., within 5 degrees, e.g., within 2 degrees, e.g., within 1 degree.

In other embodiments the edge of the opening of the cavity of the housing does not define a flat plane. For example, in some embodiments, the edge surrounding the opening of the cavity of the housing has a flexible structure, such as an accordion structure. Such a flexible structure allows the housing to closely engage with surfaces of various shapes in order to take accurate images of a wide variety of building surfaces.

In certain embodiments of the texture characterization tool as otherwise described herein, the camera is configured such that an image of a surface disposed at the opening of the cavity has a pixel density in a range from 5 pixels per mm to 1000 pixels per mm, e.g., from 10 pixel per mm to 200 pixels per mm, e.g., from 20 pixels per mm to 50 pixels per mm, or from 50 pixels per mm to 100 pixels per mm, or 100 pixels per mm to 200 pixels per mm. Further, in certain embodiments, the camera is configured to capture an image of the surface having an area in a range from 1 cm×1 cm to 10 cm×10 cm, e.g., from 3 cm×3 cm to 7 cm×7 cm, e.g., about 5 cm×5 cm.

In certain embodiments of the texture characterization tool as otherwise described herein, the edge of the opening includes a seal. For example, texture characterization tool 900 includes a seal 912 around opening 906. The seal 912 blocks light from entering cavity 904 while camera 930 is imaging the surface texture using light source 920. Thus, seal 912 prevents interference of ambient light with the light from light source 920.

In certain embodiments of the texture characterization tool as otherwise described herein, an inner surface of the cavity is dark in color. The dark color on the inner surface of the cavity reduces reflections of the light from the light source, which enhances the single directional nature of the light from the light source. By confining the illumination of the surface to a single source direction, the reflections and shadows across the building surface are substantially enhanced, which makes characterizations of the surface more accurate. The term dark, as used herein, is defined as a color in the CIELAB color space having an L* value of less than 75, e.g., L* value of less than 60, e.g., L* value of less than 50.

In certain embodiments of the texture characterization tool as otherwise described herein, the camera has a fixed focal length. For example, camera 930 of texture characterization tool 900 has a fixed focal length aligned with the plane formed by the edge 908 of opening 906. Accordingly, any flat surface placed against edge 908 is inherently at the focal point of camera 930, and focusing of camera 930 is unnecessary. The consistent distance between the camera and the plane formed by the edge 908 allows the focus of the camera to be fixed to a distance that will consistently correspond to the distance of the building surface. This lets the camera capture focused images without the need to find the proper focal length. The camera may include any of a variety of different image sensors, as will be appreciated by those of ordinary skill in the art, such as a charge-coupled device (CCD) or a complementary metal-oxide-semiconductor (CMOS) sensor.

In certain embodiments of the texture characterization tool as otherwise described herein, the light source is one or more of any of a variety of different lighting elements. For example, in certain embodiments, the light source includes a light emitting diode (LED). The LED may be part of an LED element that includes a plurality of LEDs. Moreover, the term LED as used herein includes conventional LEDs, organic light emitting diodes (OLEDs) and quantum dot LEDs. In other embodiments, the light source may be in the form of a lamp, such as an incandescent, fluorescent, or halogen bulb. Still, in other embodiments, the light source may be in the form of another lighting element, such as a laser.

In certain embodiments of the texture characterization tool as otherwise described herein, an angle between the optical axis and a line extending from the light source to a focal point of the camera is in a range from 60 degrees to 89 degrees, e.g., from 70 degrees to 85 degrees, e.g., from 80 degrees to 85 degrees. For example, the angle 914 between optical axis 932 and the illumination direction 922 is 81 degrees, where the illumination direction is the line between light source 920 and the focal point of optical axis 932.

Figure 10:
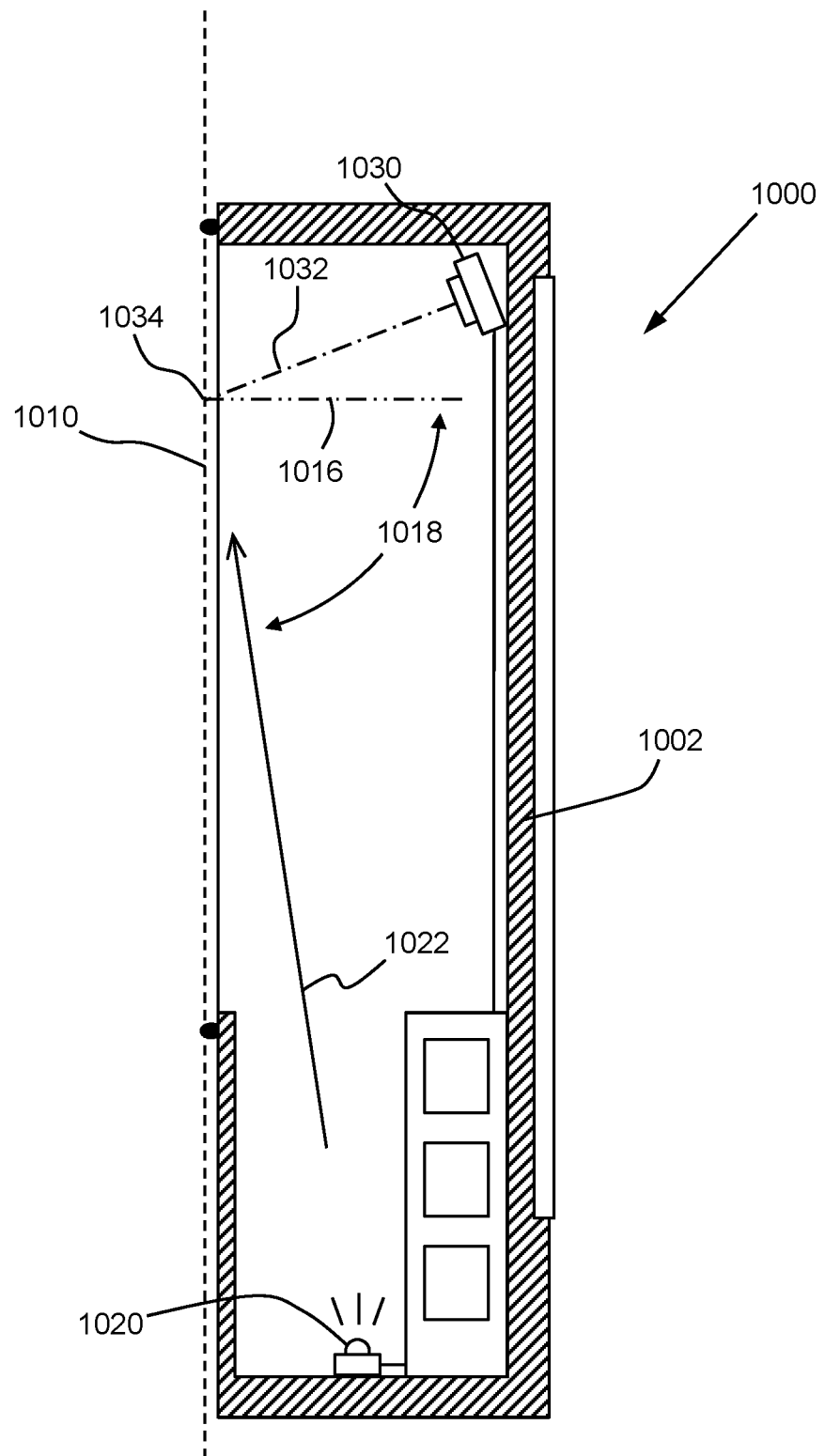
FIG. 10 is a schematic cross-sectional side view of a texture characterization tool according to another embodiment of the disclosure.

In some embodiments the optical axis of the camera is not perpendicular to the flat plane defined by the opening of the housing of the texture characterization tool. For example, in texture characterization tool 1000, shown in FIG. 10, the camera 1030 is disposed at an angle, such that the optical axis 1032 of camera 1030 is not perpendicular to flat plane 1010.

In certain embodiments of the texture characterization tool as otherwise described herein, an edge of the opening of the cavity defines a flat plane, an optical axis of the camera passes through the flat plane at a point, and an angle between an axis that is normal to the flat plane and a line extending from the light source to the point is in a range from 60 degrees to 89 degrees, e.g., from 70 degrees to 85 degrees, e.g., from 80 degrees to 85 degrees. For example, the light from light source 1020 extends along a line 1022 toward a point 1034 where the optical axis 1032 of camera 1030 intersects the flat plane 1010 formed by the opening of housing 1002. The angle 1018 between axis 1016, which is normal to flat plane 1010, and the line 1022 of light from light source 1020 is 81 degrees.

In certain embodiments of the texture characterization tool as otherwise described herein, the light source is at least 2 inches from the optical axis, e.g., at least 3 inches from the optical axis, e.g., in a range of 3 to 6 inches, e.g., about 4 inches. For example, light source 920 of texture characterization tool 900 is four inches from optical axis 932. The term about, as used herein, means plus or minus 10%.

In certain embodiments of the texture characterization tool as otherwise described herein, the texture characterization tool includes a display configured to present the comparator value or an assessment value based on the comparator value. For example, texture characterization tool 900 includes a display 960 disposed on housing 902. In some embodiments the display is a touchscreen display. Accordingly, the display can both present information to a user as well as receive information from the user.

In certain embodiments of the texture characterization tool as otherwise described herein, the texture characterization tool includes a network interface configured to transmit the comparator value or an assessment indicator that is based on the comparator value to an external device. For example, texture characterization tool 900 includes a network interface 946 for transmitting and receiving information between computing device 940 and other computing devices.

In another aspect, the disclosure provides method of preparing a surface texture of a building surface using a texture characterization tool according to the disclosure. The method includes positioning an edge of the opening of the cavity of the housing of the texture characterization tool around a first area of the building surface. The method also includes activating the texture characterization tool to illuminate the first area of the building surface from a single direction using a light source in the cavity and to capture an image of the first area of the building surface using a camera of the texture characterization tool while the first area is illuminated by the light source. The method also includes receiving a comparator value or an assessment indicator that is based on the comparator value from a computing device of the texture characterization tool.

For example, FIGS. 1 and 2 illustrate texture characterization tool 100 placed against a building surface in the form of wall 190. In particular, the edge 108 around cavity 104 is disposed around a first area 180 of wall 190. Texture characterization tool 100 is activated by pressing the "press" button on touchscreen display 160, which causes the light source 120 to illuminate the first area 180 of wall 190 and camera 130 to capture an image of the first area 180. In a subsequent step shown in FIG. 3, texture characterization tool 100 displays a comparator value 170 and assessment indicator 172 that has been calculated by computing device 140.

In certain embodiments of the method of preparing a surface texture as otherwise described herein, the method includes selecting the first area of the wall. In some embodiments, the first area of the wall is disposed within 4 inches of a joint between two wall boards. For example, as shown in FIG. 1, texture characterization tool 100 captures the first image at first area 180, which is positioned at joint 194 where a layer of joint compound 196 covers the wallboards 192.

In certain embodiments of the method of preparing a surface texture as otherwise described herein, the method includes positioning the edge of the opening of the cavity of the housing of the texture characterization tool around a second area of the wall, and activating the texture characterization tool in order to illuminate the second area of the wall from a single direction using the light source in the cavity and to capture an image of the second area of the wall using the camera of the texture characterization tool while the second area is illuminated by the light source. The comparator value is calculated based on the image of the first area and the image of the second area. For example, FIG. 3 Illustrates texture characterization tool 100 placed against wall 190 with edge 108 around cavity 104 is disposed around a second area 182 of wall 190. Texture characterization tool 100 is again activated so that light source 120 illuminates the second area 182 of wall 190 and camera 130 captures an image of the second area 182. Texture characterization tool 100 then calculates a comparator value 170 and assessment indicator 172 using computing device 140 based on the images of first area 180 and second area 182.

In certain embodiments of the method of preparing a surface texture as otherwise described herein, the method includes, in response to the comparator value or assessment indicator, modifying a first section of the wall that includes the first area. For example, in some embodiments, based on the comparator value or assessment indicator received from the texture characterization tool, the builder will carry out additional finishing steps on the building surface. Further, in some embodiments, the texture characterization tool provides instructions on what additional steps are to be taken to further modify the building surface. For example, in some embodiments, in response to the comparator value or assessment indicator, the first area of the wall is further sanded. In other embodiments the first area is coated with an additional layer of paint and/or a layer of primer. Still, in other embodiments a texture is sprayed over the first area or an additional treatment step, such as a knockdown step, is carried out in response to the comparator value and/or assessment value received from the texture characterization tool.

In other embodiments, the texture characterization tool provides other instructions to a user. For example, in some embodiments the texture characterization tool instructs the user to discontinue sanding the first area once the texture characterization tool identifies an acceptable surface texture. In another embodiment, the texture characterization tool instructs the user to reposition lighting in the room or modify the lighting on the first area of the building surface in order to accommodate the achieved surface texture.

EXAMPLE

Figure 11:
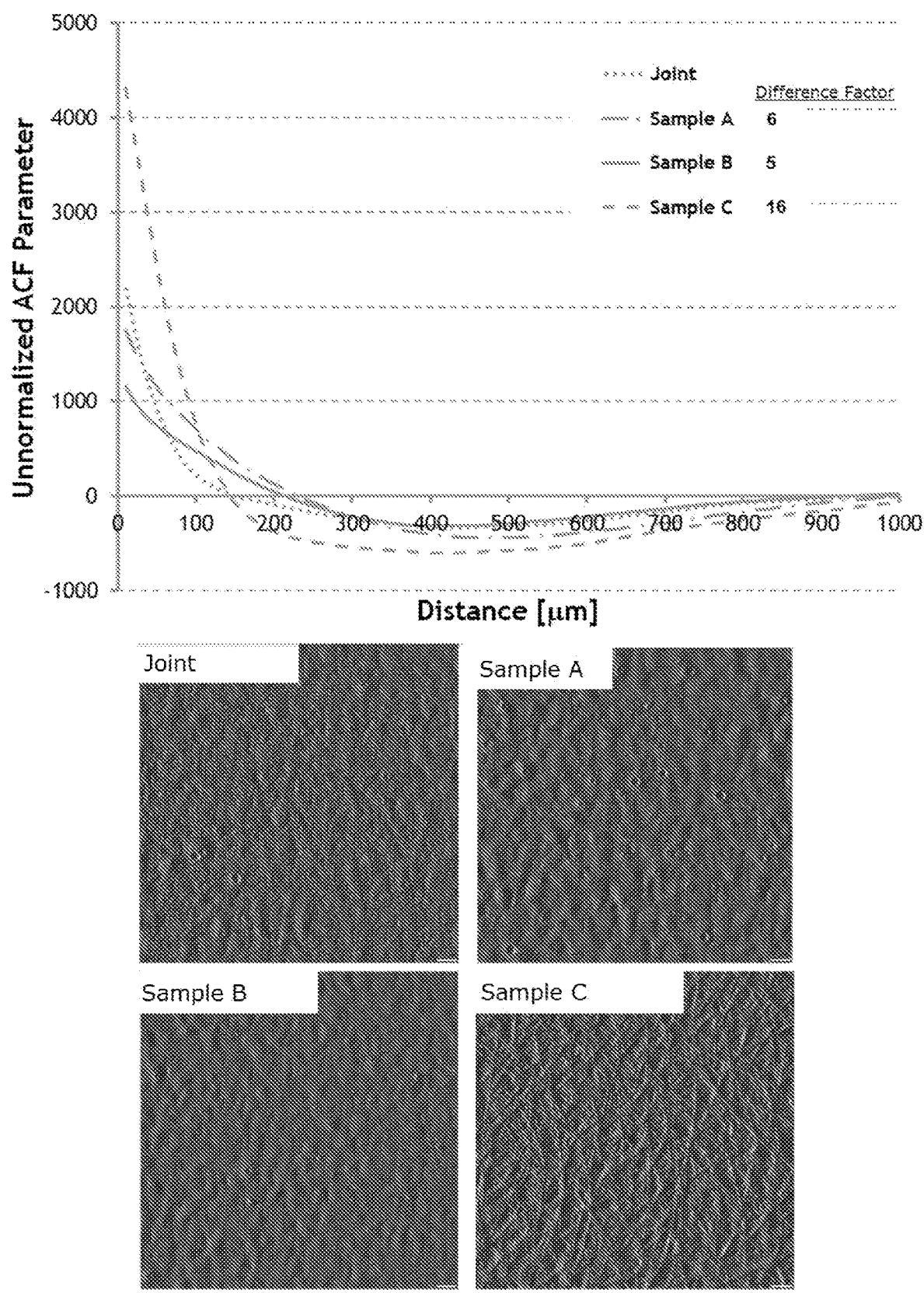
FIG. 11 shows an example of images and analysis provided by a texture characterization tool according to an embodiment of the disclosure.

FIG. 11 shows the results of a surface texture analysis that was carried out using a texture characterization tool according to an embodiment of the disclosure. Wall samples were constructed using three different types of gypsum board products. The samples were primed and painted with a coating of paint. The three samples were gypsum boards and are designated as: Sample A which has a paper facing, Sample B which has a polymer coating facing, and Sample C which has a fiberglass facing. Each of the samples were imaged with the texture characterization tool to produce the three images shown in FIG. 11. In addition, joint compound in a joint between two boards was also imaged and is shown in FIG. 11 as Joint.

The four images were then analyzed by the texture characterization tool using an autocorrelation function. Based on analysis of the values calculated by the autocorrelation function, the texture characterization tool was clearly able to discern the difference between the three products, as shown in the plot presented in FIG. 11. Furthermore, the texture characterization tool quantified the differences between each of the three products and the joint to establish a comparator value, labelled in FIG. 11 as a "difference factor." The analysis determined that the EZ-Lite board had the greatest similarity with the surface of the joint, while the DensArmor Plus board was the least similar.

Additional aspects of the disclosure are provided by the following enumerated embodiments, which can be combined in any number and in any fashion not technically or logically inconsistent.

Embodiment 1. A method of characterizing a surface texture of a building surface, the method comprising:

activating, by a computing device, a light source of a texture characterization tool while the texture characterization tool is disposed over a first area of the building surface so as to illuminate the first area from a single direction;

receiving, via the computing device, a first image of the first area captured by a camera of the texture characterization tool while the first area is illuminated by the light source, the first image including a first group of digital pixel values;

calculating, using the computing device, a first set of values that characterize a first surface texture of the first area based on the first group of digital pixel values;

comparing, using the computing device, the first set of values to a second set of values that characterize a second surface texture, so as to produce a comparator value.

Embodiment 2. The method according to claim 1, further comprising:

activating, by the computing device, the light source of the texture characterization tool while the texture characterization tool is disposed over a second area of the building surface so as to illuminate the second area from a single direction;

receiving, via the computing device, a second image of the second area captured by the camera of the texture characterization tool while the second area is illuminated by the light source, the second image including a second group of digital pixel values; and calculating, using the computing device, the second set of values based on the second group of digital pixel values.

Embodiment 3. The method according to claim 1 or claim 2, further comprising transmitting, from the computing device, the comparator value to a display.

Embodiment 4. The method according to claim 3, wherein the display is part of the texture characterization tool.

Embodiment 5. The method according to any of claims 1 to 4, wherein the comparator value is a numerical value.

Embodiment 6. The method according to any of claims 1 to 5, further comprising generating, using the computing device, an assessment indicator based on the comparator value.

Embodiment 7. The method according to claim 6, wherein the assessment indicator is a Boolean value.

Embodiment 8. The method according to claim 6, wherein the assessment indicator is a numerical value.

Embodiment 9. The method according to claim 6, wherein the assessment indicator includes a qualitative value.

Embodiment 10. The method according to any of claims 6 to 9, further comprising outputting, from the computing device, the assessment indicator to an end user.

Embodiment 11. The method according to claim 10, wherein the assessment indicator is transmitted, by the computing device, to a display.

Embodiment 12. The method according to claim 11, wherein the display is part of the texture characterization tool.

Embodiment 13. The method according to any of claims 6 to 12, further comprising receiving, from an end user, a target quality of the surface texture, and wherein generating the assessment indicator is based on the target quality received from the user.

Embodiment 14. The method according to any of claims 1 to 13, further comprising generating, using the computing device, an instruction message based on the comparator value, the instruction message including instructions for further finishing of a first section of the building surface that includes the first area.

Embodiment 15. The method according to any of claims 1 to 14, wherein calculating the first set of values includes using an autocorrelation function, where each of the first set of values corresponds to an offset distance between the image and an offset copy of the image used in autocorrelation function.

Embodiment 16. The method according to claim 15, wherein the comparator value is a difference between an extremum value of the first set of values and an extremum value of the second set of values.

Embodiment 17. The method according to claim 16, wherein the comparator value is a difference between the offset corresponding to an extremum value of the first set of values and the offset corresponding to an extremum value of the second set of values.

Embodiment 18. The method according to claim 15, wherein the comparator value is a cumulative difference between the first set of values and the second set of values.

Embodiment 19. The method according to any of claims 1 to 18, wherein calculating the first set of values includes determining a percentage of the digital pixel values of the first image that have a brightness within a first brightness range.

Embodiment 20. The method according to any of claims 1 to 19, wherein calculating the first set of values includes identifying shapes within the first group of pixels defined by a brightness range.

Embodiment 21. The method according to claim 22, wherein the first set of values includes a value quantifying the identified shapes from the first group of pixels, for example based on size, compactness or orientation.

Embodiment 22. The method according to any of claims 1 to 21, further comprising:

receiving, via the first computing device, an initial image of the first area;

measuring, using the first computing device, a brightness of the initial image; and in response to the brightness of the initial image, setting a light intensity value of the light source that is used during the capturing of the first image.

Embodiment 23. The method according to any of claims 1 to 22, wherein the computing device includes a non-transitory computer-readable medium storing a three-dimensional rendering of an architectural space including the building surface, and wherein the method further comprises:

determining, by the computing device, a target location of the first area based on lighting parameters of the three-dimensional rendering of the architectural space; and outputting, via the computing device, a positioning instruction to an end user based on the target location.

Embodiment 24. The method according to claim 23, wherein the positioning instruction includes a target height of the texture characterization tool for capturing the first image.

Embodiment 25. The method according to claim 23 or claim 24, wherein the positioning instruction includes a target orientation of the characterization tool for capturing the first image.

Embodiment 26. The method according to any of claims 23 to 25, wherein the positioning instruction includes an image of a 3D rendering of an architectural space that includes the building surface and shows a target location of the texture characterization tool for capturing the first image.

Embodiment 27. A non-transitory computer-readable medium having stored thereon program instructions that upon execution by a processor, cause performance of a set of operations to perform the method of any of claims 1 to 26.

Embodiment 28. A computing device comprising:
a processor; and
a non-transitory computer-readable medium according to claim 27.

Embodiment 29. A texture characterization tool comprising:
a housing including a cavity and an opening on one side of the housing providing access to the cavity;
the computing device according to claim 28;
a camera disposed opposite the opening and having an optical axis that passes through the opening of the cavity; and
a light source configured to provide light inside the cavity and project the light toward the optical axis of the camera from a single direction.

Embodiment 30. The texture characterization tool according to claim 29, wherein an edge of the opening of the cavity defines a flat plane.

Embodiment 31. The texture characterization tool according to 30, wherein the flat plane defined by the edge of the opening is substantially perpendicular to the optical axis of the camera.

Embodiment 32. The texture characterization tool according to claim 30 or claim 31, wherein the camera is configured such that an image of a surface disposed at the opening of the cavity has a pixel density in a range from 5 pixels per mm to 1000 pixels per mm, e.g., from 10 pixel per mm to 200 pixels per mm, e.g., from 20 pixels per mm to 50 pixels per mm, or from 50 pixels per mm to 100 pixels per mm, or 100 pixels per mm to 200 pixels per mm.

Embodiment 33. The texture characterization tool according to any of claims 29 to 32, wherein the edge of the opening includes a seal.

Embodiment 34. The texture characterization tool according to any of claims 29 to 33, wherein an inner surface of the cavity is dark in color.

Embodiment 35. The texture characterization tool according to any of claims 29 to 34, wherein the camera has a fixed focal length.

Embodiment 36. The texture characterization tool according to any of claims 29 to 35, wherein the light source includes an LED.

Embodiment 37. The texture characterization tool according to any of claims 29 to 36, wherein an angle between the optical axis and a line extending from the light source to a focal point of the camera is in a range from 60 degrees to 87 degrees, e.g., from 70 degrees to 85 degrees, e.g., from 80 degrees to 85 degrees.

Embodiment 38. The texture characterization tool according to any of claims 29 to 37, wherein an edge of the opening of the cavity defines a flat plane,
wherein an optical axis of the camera passes through the flat plane at a point, and
wherein an angle between an axis that is normal to the flat plane and a line extending from the light source to the point is in a range from 60 degrees to 87 degrees, e.g., from 70 degrees to 85 degrees, e.g., from 80 degrees to 85 degrees.

Embodiment 39. The texture characterization tool according to any of claims 29 to 38, wherein the light source is at least 2 inches from the optical axis, e.g., at least 3 inches from the optical axis, e.g., in a range from 3 inches to 6 inches, e.g., about 4 inches.

Embodiment 40. The texture characterization tool according to any of claims 29 to 39, further comprising a display configured to present the comparator value or an assessment value based on the comparator value.

Embodiment 41. The texture characterization tool according to any of claims 29 to 40, further comprising a network interface configured to transmit the comparator value or an assessment indicator that is based on the comparator value to an external device.

Embodiment 42. A method of preparing a building surface using a texture characterization tool according to any of claims 29 to 41, the method comprising:
positioning an edge of the opening of the cavity of the housing of the texture characterization tool around a first area of the building surface;
activating the texture characterization tool to illuminate the first area of the building surface from a single direction using a light source in the cavity and to capture an image of the first area of the building surface using a camera of the texture characterization tool while the first area is illuminated by the light source; and
receiving a comparator value or an assessment indicator that is based on the comparator value from a computing device of the texture characterization tool.

Embodiment 43. The method according to claim 42, further comprising selecting the first area of the building surface.

Embodiment 44. The method according to claim 42 or claim 43, wherein the first area of the building surface is disposed within 4 inches of a joint between two wall boards.

Embodiment 45. The method according to any of claims 42 to 44, further comprising positioning the edge of the opening of the cavity of the housing of the texture characterization tool around a second area of the building surface;
activating the texture characterization tool to illuminate the second area of the building surface from a single direction using the light source in the cavity and to capture an image of the second area of the building surface using the camera of the texture characterization tool while the second area is illuminated by the light source,
wherein the comparator value is calculated based on the image of the first area and the image of the second area.

Embodiment 46. The method according to any of claims 42 to 45, further comprising, responsive to the comparator value or assessment indicator, modifying a first section of the building surface that includes the first area.

Embodiment 47. The method according to claim 46, wherein modify the first section of the building surface includes sanding the building surface.

Embodiment 48. The method according to claim 46 or claim 47, wherein modifying the first section of the building surface includes covering the first section of wall with a coat of paint.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A method of preparing a building surface, the method comprising:
providing a comparator value or an assessment indicator that is based on the comparator value with respect to a first area of the building surface, wherein the comparator value is provided by a method comprising receiving a first image of the first area captured while the first area is illuminated by a light source from a single direction, the first image including a first group of digital pixel values;

calculating a first set of values that characterize a first surface texture of the first area based on the first group of digital pixel values; and comparing the first set of values to a second set of values that characterize a second surface texture, so as to produce a comparator value; and responsive to the comparator value or assessment indicator, modifying a first section of the building surface that includes the first area.

2. The method according to claim 1, wherein the first area of the building surface is disposed within 4 inches of a joint between two wall boards.

3. The method according to claim 1, wherein the method for providing the comparator value comprises;

receiving a second image of a second area of the building surface while the second area is illuminated by the light source from the single direction, the second image including a second group of digital pixel values, wherein the second set of values is calculated from the second group of digital pixel values.

4. The method according to claim 1, wherein modifying the first section of the building surface includes sanding the building surface.

5. The method according to claim 1, wherein modifying the first section of the building surface includes covering the first section of wall with a coat of paint.

6. The method according to claim 1, wherein an assessment indicator is provided, and wherein the assessment indicator is based on a target surface texture quality.

7. The method according to claim 6, wherein the assessment indicator is a Boolean value.

8. The method according to claim 6, wherein the assessment indicator is a numerical value.

9. The method according to claim 6, wherein the assessment indicator includes a qualitative value.

10. The method according to claim 1, wherein an instruction message based on the comparator value is provided, the instruction message including instructions for further finishing of the first section of the building surface, and wherein modifying the first section of the building surface includes following the instructions.

11. The method according to claim 1, wherein calculating the first set of values includes using an autocorrelation function, where each of the first set of values corresponds to an offset distance between the image and an offset copy of the image used in autocorrelation function.

12. The method according to claim 11, wherein the comparator value is a difference between an extremum value of the first set of values and an extremum value of the second set of values.

13. The method according to claim 12, wherein the comparator value is a difference between the offset corresponding to an extremum value of the first set of values and the offset corresponding to an extremum value of the second set of values.

14. The method according to claim 11, wherein the comparator value is a cumulative difference between the first set of values and the second set of values.

15. The method according to claim 1, wherein calculating the first set of values includes determining a percentage of the digital pixel values of the first image that have a brightness within a first brightness range.

16. The method according to claim 1, wherein calculating the first set of values includes identifying shapes within the first group of pixels defined by a brightness range.

17. The method according to claim 1, wherein an angle between the direction of illumination and an optical axis extending from the focal point of a camera with which the image is captured to the surface is in the range of 60-87 degrees.

18. The method according to claim 1, wherein an angle between the direction of illumination and an optical axis extending from the focal point of a camera with which the image is captured to the surface is in the range of 70-85 degrees.

19. The method according to claim 1, wherein an angle between the direction of illumination and an optical axis extending from the focal point of a camera with which the image is captured to the surface is in the range of 80-85 degrees.

20. The method according to claim 1, wherein the second set of values is selected from a group of stored sets of values based on surface texture or surface finish requirements.

* * * * *